(12) United States Patent
Hagihara

(10) Patent No.: US 8,033,196 B2
(45) Date of Patent: Oct. 11, 2011

(54) RESIN DOUBLE HELICAL GEAR PAIR

(75) Inventor: Toru Hagihara, Kawaguchi (JP)

(73) Assignee: Enplas Corporation, Saitama (JP)

( * ) Notice: Subject to any disclaimer, the term of this patent is extended or adjusted under 35 U.S.C. 154(b) by 971 days.

(21) Appl. No.: 11/974,321

(22) Filed: Oct. 12, 2007

(65) Prior Publication Data
US 2008/0092684 A1 Apr. 24, 2008

(30) Foreign Application Priority Data

Oct. 19, 2006 (JP) .................... 2006-284840
Oct. 19, 2006 (JP) .................... 2006-284934
Dec. 13, 2006 (JP) .................... 2006-335246

(51) Int. Cl.
*F16H 55/17* (2006.01)
(52) U.S. Cl. ........................ 74/458; 74/DIG. 10
(58) Field of Classification Search .................... 74/457, 74/458, 459.5, 461, 462, DIG. 10
See application file for complete search history.

(56) References Cited

FOREIGN PATENT DOCUMENTS

| JP | 2005-069458 | 3/2005 |
|---|---|---|
| JP | 2006-250182 | 9/2006 |

OTHER PUBLICATIONS

Shigeta Yoshimoto et al., Machine Design:Design of Mechanical Components and System, Rikogaku Co., May 20, 2006, Japan.

*Primary Examiner* — Thomas R Hannon
*Assistant Examiner* — Phillip A Johnson
(74) *Attorney, Agent, or Firm* — DLA Piper LLP (US)

(57) ABSTRACT

It is an object of the present invention to approximate of life of each resin double helical gear of a gearing resin double helical gear pair to each other by effectively increasing the strength of the tooth of the resin double helical gear with the higher rotational speed; and to lengthen life of the gearing resin double helical gear pair by effectively increasing the strength of the tooth of the resin double helical gear that comes to the end of its life earlier due to stress concentration out of the gearing resin double helical gear pair. A resin double helical gear pair includes a first resin double helical gear and a second resin double helical gear with the larger diameter gearing into the first double helical gear. The first double helical gear is formed so that at least an addendum modification coefficient of a peak of a chevron tooth is larger than addendum modification coefficients of other sections. The second double helical gear is formed so that a sum of the addendum modification coefficient of the first double helical gear and an addendum modification coefficient of the second double helical gear in a gearing position of the first double helical gear and the second double, helical gear is a constant value along a tooth width direction.

12 Claims, 10 Drawing Sheets

RESIN DOUBLE HELICAL GEAR PAIR

BACKGROUND OF THE INVENTION

1. Field of the Invention

The present invention relates to a resin double helical gear pair composing part of a gear train for power transmission.

2. Description of the Related Art

In the past, a gearing resin double helical gear pair has been used as part of a gear train for power transmission, in order to quiet down the operating sound and deaden the vibrations in power transmission (refer to Patent Literature 1).

However, in the gearing resin double helical gear pair, a larger stress acts on a dedendum of a peak located in the center in the full tooth width direction of a chevron tooth, compared to a stress on a dedendum of sections other than the vicinity of the peak of the tooth. Therefore, the gearing resin double helical gear pair firstly comes to the end of its life due to the resultant stress difference.

Therefore, engineers taking charge of mechanical structure design have demanded a technology by which the stress value of the dedendum of the peak located in the center in the full tooth width direction of the resin double helical gear can be reduced, and by which the strength of the tooth of the resin double helical gear can be increased.

Specially, in the case that the rotational speed of one resin double helical gear is different from that of the other resin double helical gear in a resin double helical gear pair (in the case of deceleration or acceleration), the resin double helical gear with the higher rotational speed comes to the end of its life earlier than the resin double helical gear with the lower rotational speed.

For example, when a double helical gear with the smaller diameter and a double helical gear with the larger diameter are combined in a gearing resin double helical gear pair, a large stress acts on the dedendum of the vicinity of the peak of the tooth in the double helical gear with the smaller diameter and the higher rotational speed, and thus the double helical gear with the smaller diameter comes to the end of its life first.

Therefore, engineers taking charge of mechanical structure design have demanded that the tooth of the resin double helical gear with the higher rotational speed is reinforced, and thereby the life of the resin double helical gear with the higher rotational speed and the life of the resin double helical gear with the lower rotational speed are approximated to each other.

Further, experience shows the following fact. That is, even when 2 double helical gears with the identical diameter gear into each other in a gearing resin double helical gear pair, the dedendum of the vicinity of the peak of a tooth of the double helical gear on the drive side comes to the end of its life earlier than the dedendum of the vicinity of the peak of a tooth of the double helical gear on the driven side.

As a method to solve the forgoing problem, it is conceivable that the tooth thickness of the dedendum of a tooth is thickened by addendum modification, and thereby the dedendum strength is increased (refer to Nonpatent Literature 1).

A technology to change the addendum modification coefficient of a tooth of a spur gear from one end side to the other end side in the tooth width direction has been already developed (refer to Patent Literature 2).

However, in the existing technology disclosed in Nonpatent Literature 1, the entire tooth is provided with positive addendum modification. Therefore, when such a technology is applied to the resin double helical gear, the tooth thickness of the dedendum of the tooth is thickened uniformly in the entire region in the tooth width direction, and thus it is not possible to effectively reinforce only the dedendum of the vicinity of the peak of the tooth necessary for reinforcement. In result, the entire resin amount is increased, and thus the entire weight becomes excessively heavy. Further, the gearing ratio is decreased, and thus the noise is increased.

Further, the existing technology disclosed in Patent Literature 2 is intended to adjust backlash of a gearing section to inhibit generation of abnormal sound resulting from the backlash. In such a technology, the addendum modification coefficient is changed from one end side to the other end side in the tooth width direction. Therefore, it is not possible to thicken the tooth thickness of the dedendum in the section on which a stress is concentrated more than the thickness of the dedendum in the other sections and to effectively increase the strength of the dedendum.

Patent Literature 1: Japanese Patent Laid-open Publication No. 2005-69458 (refer to paragraph No. 0007 and FIG. 4)

Patent Literature 2: Japanese Patent Laid-open Publication No. 2006-250182 (refer to paragraph No. 0020 and FIG. 3)

Nonpatent Literature 1: "Machine design: design of mechanical components and system," Shigeka Yoshimoto et al., First edition, Rikogaku Co., May 20, 2006, p. 208.

SUMMARY OF THE INVENTION

Therefore, an object of the present invention is to provide a technology that can lengthen the life of a gearing resin double helical gear pair with the use of a technology capable of effectively increasing the strength of a tooth of a resin double helical gear, and that can effectively increase the strength of the resin double helical gear with the higher rotational speed and thus can approximate life of each resin double helical gear of the gearing resin double helical gear pair to each other.

The invention according to claim 1 relates to a resin double helical gear pair. The resin double helical gear pair includes a first resin double helical gear and a second resin double helical gear gearing into the first double helical gear. The first double helical gear has a diameter smaller than a diameter of the second double helical gear. In the resin double helical gear pair according to the invention, the first double helical gear is formed so that at least an addendum modification coefficient of a peak of a chevron tooth is larger than addendum modification coefficients of other sections. The second double helical gear is formed so that a sum of the addendum modification coefficient of the first double helical gear and an addendum modification coefficient of the second double helical gear in a gearing position of the first double helical gear and the second double helical gear is a constant value along a tooth width direction.

The invention according to claim 2 relates to a resin double helical gear pair. The resin double helical gear pair includes a first resin double helical gear on a drive side and a second resin double helical gear gearing into the first double helical gear on a driven side. The first double helical gear and the second double helical gear have the same diameter. In the resin double helical gear pair according to the invention, the first double helical gear is formed so that at least an addendum modification coefficient of a peak of a chevron tooth is larger than addendum modification coefficients of other sections. The second double helical gear is formed so that a sum of the addendum modification coefficient of the first double helical gear and an addendum modification coefficient of the second double helical gear in a gearing position of the first double helical gear and the second double helical gear is a constant value along a tooth width direction.

The invention according to claim 3 relates to a resin double helical gear pair. The resin double helical gear pair includes a first resin double helical gear and a second resin double helical gear gearing into the first double helical gear. The first double helical gear has a diameter smaller than a diameter of the second double helical gear. In the resin double helical gear pair according to the invention, the first double helical gear is formed so that an addendum modification coefficient of a vicinity of a peak of a chevron tooth is larger than addendum modification coefficients of other sections. The second double helical gear is formed so that a sum of the addendum modification coefficient of the first double helical gear and an addendum modification coefficient of the second double helical gear in a gearing position of the first double helical gear and the second double helical gear is a constant value along a tooth width direction.

The invention according to claim 4 relates to a resin double helical gear pair. The resin double helical gear pair includes a first resin double helical gear on a drive side and a second resin double helical gear gearing into the first double helical gear on a driven side. The first double helical gear and the second double helical gear have the same diameter. In the resin double helical gear pair according to the invention, the first double helical gear is formed so that at least an addendum modification coefficient of a vicinity of a peak of a chevron tooth is larger than addendum modification coefficients of other sections. The second double helical gear is formed so that a sum of the addendum modification coefficient of the first double helical gear and an addendum modification coefficient of the second double helical gear in a gearing position of the first double helical gear and the second double helical gear is a constant value along a tooth width direction.

The invention according to claim 5 relates to a resin double helical gear pair. The resin double helical gear pair includes a first resin double helical gear and a second resin double helical gear gearing into the first double helical gear. The first double helical gear has a diameter smaller than a diameter of the second double helical gear. In the resin double helical gear pair according to the invention, the first double helical gear is formed so that an addendum modification coefficient is gradually decreased as a position is changed from a peak of a chevron tooth toward both ends in a tooth width direction. The second double helical gear is formed so that a sum of the addendum modification coefficient of the first double helical gear and an addendum modification coefficient of the second double helical gear in a gearing position of the first double helical gear and the second double helical gear is a constant value along the tooth width direction.

The invention according to claim 6 relates to a resin double helical gear pair. The resin double helical gear pair includes a first resin double helical gear on a drive side and a second resin double helical gear gearing into the first double helical gear on a driven side. The first double helical gear and the second double helical gear have the same diameter. In the resin double helical gear pair according to the invention, the first double helical gear is formed so that an addendum modification coefficient is gradually decreased as a position is changed from a peak of a chevron tooth toward both ends in a tooth width direction. The second double helical gear is formed so that a sum of the addendum modification coefficient of the first double helical gear and an addendum modification coefficient of the second double helical gear in a gearing position of the first double helical gear and the second double helical gear is a constant value along the tooth width direction.

The invention according to claim 7 relates to a resin double helical gear pair. The resin double helical gear pair includes: one resin double helical gear having multiple chevron teeth in the shape as if one helical gear is joined to the other helical gear with the skew direction different from that of the one helical gear in a center in a width direction; and the other resin double helical gear having multiple teeth gearing into the teeth of the one resin double helical gear. In the invention, the teeth of the one resin double helical gear are formed so that at least a pressure angle of the vicinity of the center in the tooth width direction is larger than a pressure angle of sections other than the vicinity of the center in the tooth width direction. The teeth of the other resin double helical gear are formed so that a pressure angle is changed in the same manner as the teeth of the one resin double helical gear.

The invention according to claim 8 is the resin double helical gear pair according to claim 7, in which the pressure angle of the vicinity of the center in the width direction of the teeth of the one resin double helical gear is gradually decreased as the position is changed from the center in the tooth width direction toward an end side in the tooth width direction. Further, the pressure angle of the sections other than the vicinity of the center in the tooth width direction of the teeth of the one resin double helical gear is changed continuously from change of the pressure angle of the vicinity of the center in the tooth width direction.

The invention according to claim 9 is the resin double helical gear pair according to claim 7, in which, in the teeth of the one resin double helical gear, the pressure angle of the vicinity of the center in the tooth width direction is constant, and the pressure angle of the sections other than the vicinity of the center in the tooth width direction is gradually decreased as the position departs from the vicinity of the center in the tooth width direction.

The invention according to claim 10 is the resin double helical gear pair according to claim 7, in which, in the teeth of the one resin double helical gear, the pressure angle of the vicinity of the center in the tooth width direction is constant, and the pressure angle of the sections other than the vicinity of the center in the tooth width direction is smaller than the pressure angle of the vicinity of the center in the tooth width direction and is constant.

The invention according to claim 11 relates to a resin double helical gear pair having multiple chevron teeth in the shape as if one helical gear is joined to the other helical gear with the skew direction different from that of the one helical gear in a center in a width direction. The number of teeth of one gearing resin double helical gear is smaller than the number of teeth of the other gearing resin double helical gear. In the invention, in the one resin double helical gear, a peak on a dedendum side of a chevron tooth and a valley section on a dedendum side of an adjacent tooth are connected by a stiffing rib protruding from a bottom in the central section in a tooth width direction. In the other resin double helical gear, a stiffening rib recess groove along a rotational direction is formed in the central section in the tooth width direction of the tooth and on a tooth tip side of the tooth, so that the stiffening rib of the one resin double helical gear does not interfere with the tooth in power transmission.

The invention according to claim 12 relates to a resin double helical gear pair. The resin double helical gear pair includes: one resin double helical gear having multiple chevron teeth in the shape as if one helical gear is joined to the other helical gear with the skew direction different from that of the one helical gear in a center in a width direction; and the other resin double helical gear having multiple chevron teeth gearing into the teeth of the one resin double helical gear. In the invention, in the one resin double helical gear and the other resin double helical gear, a peak on a dedendum side of a chevron tooth and a valley section on a dedendum side of an adjacent tooth are connected by a stiffing rib protruding from a bottom in the central section in a tooth width direction. In the one resin double helical gear and the other resin double helical gear, a stiffening rib recess groove along a rotational direction is formed in the central section in the tooth width direction of the tooth and on a tooth tip side of the tooth, so that the stiffening rib of a gearing counterpart does not interfere with the tooth in power transmission.

Effect of the Invention

According to the invention of claim 1 to claim 6, out of the gearing resin double helical gear pair, the strength of the first double helical gear that comes to the end of its life earlier can be effectively increased at least in the peak of the chevron tooth subject to stress concentration. In result, in the invention, lives of the first double helical gear and the second double helical gear can be approximated to each other, and life of the resin double helical gear pair can be lengthened.

According to the invention of claim 7 to claim 10, the strength of the gearing resin double helical gear pair can be effectively increased at least in the vicinity of the center of the full tooth width subject to stress concentration. In result, in the invention, life of the resin double helical gear pair can be lengthened.

According to the invention of claim 11, the strength of the resin double helical gear with the higher rotational speed out of the gearing resin double helical gear pair can be effectively increased by the stiffing rib connecting adjacent teeth in the central section in the tooth width direction on the dedendum side thereof. In result, in the invention, lives of each of the resin double helical gear pair (one double helical gear and the other double helical gear) can be approximated to each other.

According to the invention of claim 12, out of the gearing resin double helical gear pair, the stiffing rib can reinforce the dedendum side in the central section in the tooth width direction on which the largest stress acts. Therefore, the strength of the gearing resin double helical gear pair can be effectively increased.

BRIEF DESCRIPTION OF THE DRAWINGS

FIG. 3a is a partial plan view that schematically shows the first resin double helical gear out of the resin double helical gear pair according to the first embodiment of the present invention;

FIG. 3b is a cross section taken along line A-A of FIG. 3a;

FIG. 5a is a partial plan view that schematically shows a first double helical gear out of the resin double helical gear pair according to the second embodiment of the present invention;

FIG. 5b is a cross section taken along line A-A of FIG. 5a;

FIG. 5c is a view seen from direction B of FIG. 5a;

FIG. 6a is a partial plan view that schematically shows a second resin double helical gear out of the resin double helical gear pair according to the second embodiment of the present invention;

FIG. 6b is a cross section taken along line C-C of FIG. 6a;

FIG. 6c is a view seen from direction D of FIG. 6a;

FIG. 10a is a partial plan view that schematically shows a first double helical gear out of the resin double helical gear pair according to the third embodiment of the present invention;

FIG. 10b is a cross section taken along line A-A of FIG. 10a;

FIG. 10c is a cross section taken along line B-B of FIG. 10a;

FIG. 10d is a cross section showing a first modified example of a stiffing rib (cross section corresponding to FIG. 10c);

FIG. 10e is a cross section showing a second modified example of the stiffing rib (cross section corresponding to FIG. 10c);

FIG. 10f is a cross section showing a third modified example of the stiffing rib (cross section corresponding to FIG. 10c);

FIG. 11a is a partial plan view that schematically shows a second double helical gear out of the resin double helical gear pair according to the third embodiment of the present invention;

FIG. 11b is a cross section taken along line C-C of FIG. 11a;

FIG. 11c is a cross section taken along line D-D of FIG. 11a;

FIG. 11d is a cross section showing a first modified example of a stiffing rib recess groove (cross section corresponding to FIG. 11c);

FIG. 11e is a cross section showing a second modified example of the stiffing rib recess groove (cross section corresponding to FIG. 11c); and FIG. 11f is a cross section showing a third modified example of the stiffing rib recess groove (cross section corresponding to FIG. 11c).

DETAILED DESCRIPTION OF THE PREFERRED EMBODIMENT

A first embodiment of the present invention will be described in detail, with reference to FIG. 1 to FIG. 3b.

Figure 1:
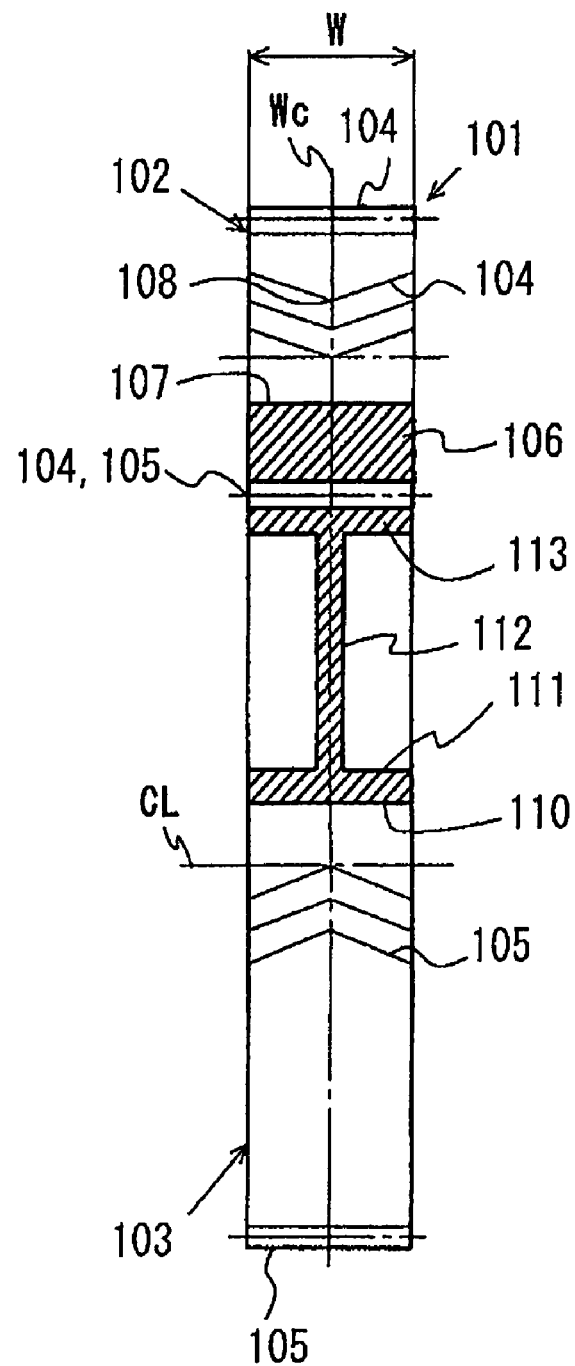
FIG. 1 is a view showing a resin double helical gear pair according to a first embodiment of the present invention (with part of the resin double helical gear pair broken in the figure)
Figure 2:
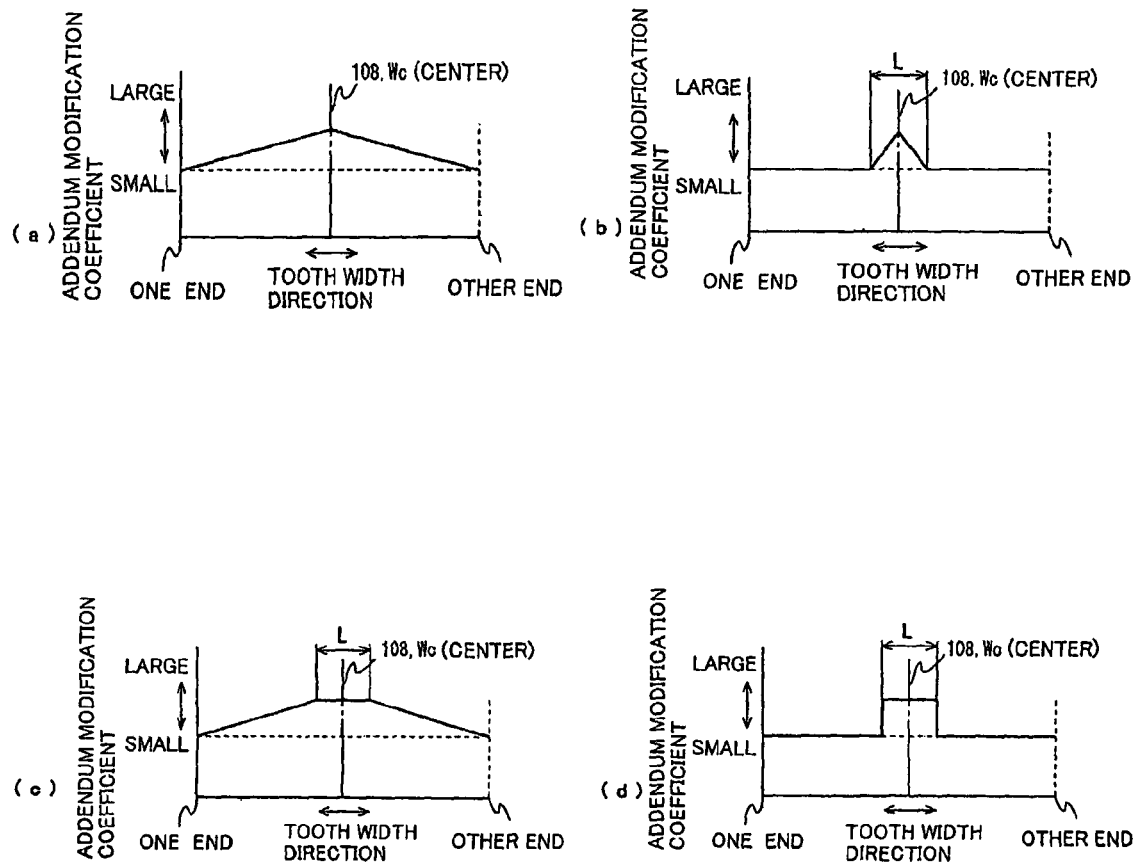
FIGS. 2a to 2d are diagrams showing change of an addendum modification coefficient along the tooth width direction of a first resin double helical gear out of the resin double helical gear pair according to the first embodiment of the present invention.
Figure 3:
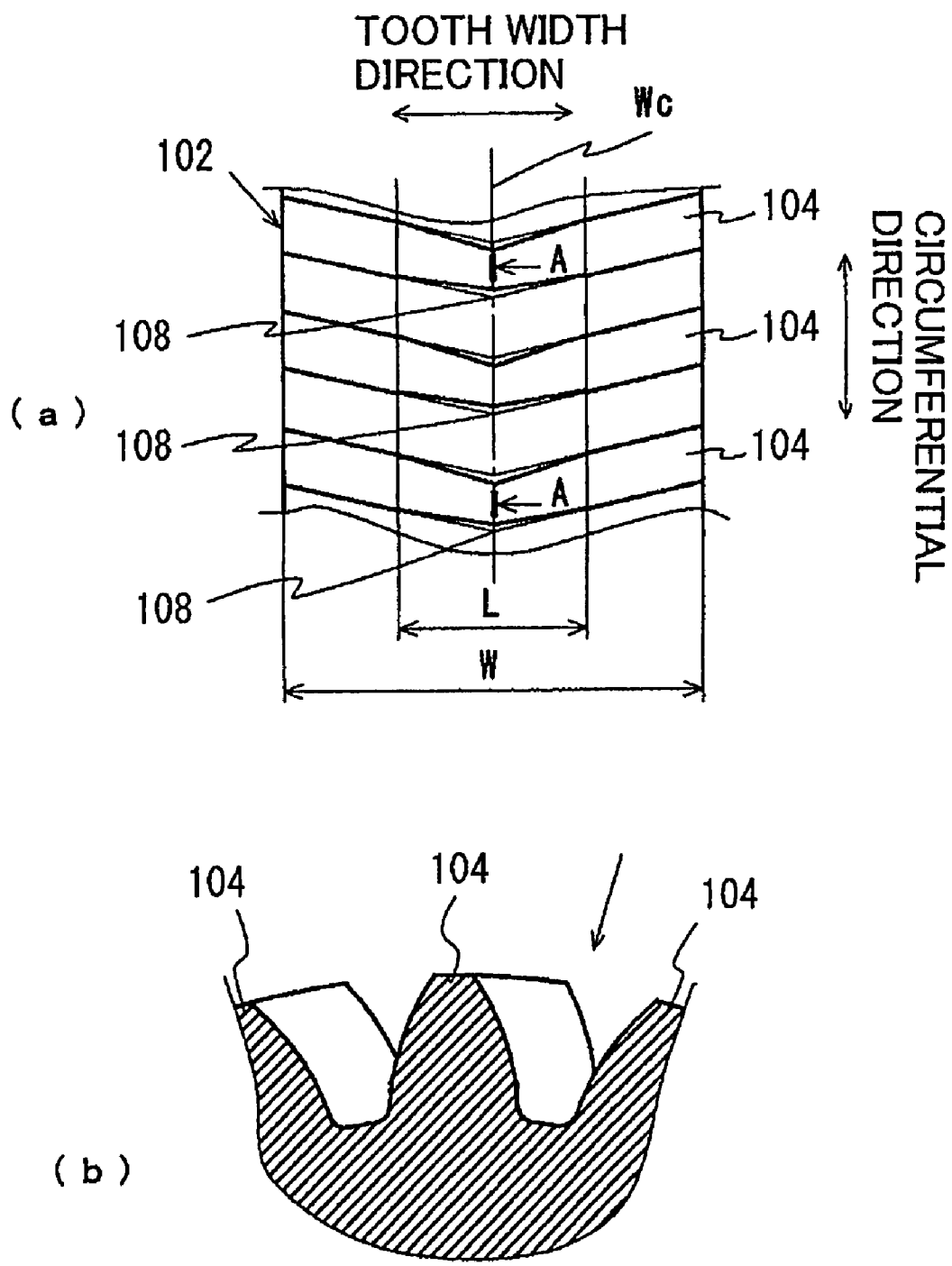

FIG. 1 shows a gearing resin double helical gear pair 101. Each resin double helical gear of the resin double helical gear pair 101 shown in FIG. 1 is injection-molded by using the same resin material (polyacetal (POM), polyamide, polycarbonate, ABS resin or the like). The resin double helical gear pair 101 is composed of a first double helical gear 102 with the smaller diameter and the smaller number of teeth and a second double helical gear 103 with the larger diameter and the larger number of teeth. A tooth 104 of the first double helical gear 102 and a tooth 105 of the second double helical gear 103 are in a shape as shown in FIGS. 3a and 3b. In the figures, the plain face of the tooth 104 is in chevron-shaped, that is, approximately V-shaped. In the resin double helical gear pair 101, where the number of teeth of the first double helical gear 102 is Z1 and the number of teeth of the second double helical gear 103 is Z2, the deceleration ratio when power is transmitted from the first double helical gear 102 to the second double helical gear 103 is Z2/Z1, and the acceleration ratio is Z1/Z2.

In the first double helical gear 102 shown in FIG. 1, an axis hole 107 is formed in the central section of a web 106. A plurality of teeth 104 are formed on the outer circumferential side of the web 106. The tooth 104 is formed so that the addendum modification coefficient is changed as shown in one of FIGS. 2a to 2d. That is, as shown in FIGS. 2a to 2d, the tooth 104 of the first double helical gear 102 is formed so that the addendum modification coefficient becomes largest at least in the center of the full tooth width Wc (position that is the center in the tooth width direction and corresponds to a peak 108 of the tooth 104 (refer to FIG. 3a)). In the tooth 104 of FIG. 2a, the addendum modification coefficient becomes largest in the center in the tooth width direction Wc, and the addendum modification coefficient is gradually decreased as the position is changed from the center in the tooth width direction Wc toward the both ends in the tooth width direction. The tooth 104 of FIG. 2b is formed as follows. In the same manner as in FIG. 2a, the addendum modification coefficient becomes largest in the center in the tooth width direction Wc. However, the addendum modification coefficient is gradually decreased within the range of vicinity L of the center in the tooth width direction Wc (peak 108) (for example, where the full tooth width is W as shown in FIG. 3a, the range in which L is approximately W/5 and the strength of the dedendum due to stress concentration is subject to a problem). The addendum modification coefficient in a range from the end of the vicinity L of the center in the tooth width direction Wc to the end in the tooth width direction is constant (including the case that the addendum modification coefficient is 0). The tooth 104 of FIG. 2c is formed so that the addendum modification coefficient is constant in the vicinity L of the center in the tooth width direction Wc, and the addendum modification coefficient is gradually decreased as the position is changed from the end of the vicinity L of the center in the tooth width direction Wc toward the end in the tooth width direction. In the same manner as in FIG. 2c, in the tooth 104 of FIG. 2d, the addendum modification coefficient is constant in the vicinity L of the center in the tooth width direction Wc. However, the tooth 104 of FIG. 2d is formed so that, in the range from the end of the vicinity L of the center in the tooth width direction Wc to the end in the tooth width direction, the addendum modification coefficient is the constant value smaller than the addendum modification coefficient in the vicinity L of the center in the tooth width direction Wc (including the case that the addendum modification coefficient is 0).

In the first double helical gear 102 including the tooth 104 with the addendum modification coefficient shown in FIGS. 2a and 2b, the tooth thickness of the dedendum of the center in the tooth width direction Wc (peak 108) on which the largest stress supposedly acts is larger than the tooth thickness of the dedendum of the other sections. Thus, the strength of the dedendum of the center in the tooth width direction Wc (peak 108) becomes larger than the strength of the dedendum of the other sections.

In the first double helical gear 102 including the tooth 104 with the addendum modification coefficient shown in FIGS. 2c and 2d, the tooth thickness of the dedendum of the vicinity L of the center in the tooth width direction Wc (peak 108) in which the dedendum strength due to stress concentration is subject to a problem is larger than the tooth thickness of the dedendum of the other sections. Thus, the strength of the dedendum of the vicinity L of the center in the tooth width direction Wc (peak 108) becomes larger than the strength of the dedendum of the other sections.

As described above, in the first double helical gear 102 of this embodiment, the strength of the peak 108 and the strength of the vicinity L including the peak 108 of the tooth 104 subject to stress concentration can be effectively increased.

The first double helical gear 102 described above is used as, for example, a pinion gear fixed to the output shaft of the motor to work as part of a decelerator. Otherwise, the first double helical gear 102 described above is used as, for example, a gear on the driven side to work as part of an accelerator.

The second double helical gear 103 shown in FIG. 1 includes a boss section 111 formed with an axis hole 110 in the central section, a discoid web 112 extending from the section that is located on the outer circumferential side of the boss section 111 and in the central section in the width direction (central section in the direction along axis center CL) toward outside in the diameter direction, and a cylindrical rim 113 formed on the outer circumference of the web 112. The plurality of teeth 105 gearing into the teeth 104 of the first double helical gear 102 are formed on the outer circumferential side of the rim 113.

The tooth 105 of the second double helical gear 103 is formed so that the sum of the addendum modification coefficient of the first double helical gear 102 and the addendum modification coefficient of the second double helical gear 103 in the gearing position is constant along the tooth width direction.

The sum of the addendum modification coefficient of the first double helical gear 102 and the addendum modification coefficient of the second double helical gear 103 is set to a value at which lowering of the gearing ratio can be inhibited, the strength of the tooth 104 of the first double helical gear 102 can be effectively increased, and the lives of the first double helical gear 102 and the second double helical gear 103 can be approximated to each other, on the basis of JGMA601-01 according to ISO standards.

The second double helical gear 103 in the foregoing shape is used twin to the first double helical gear 102, and works as part of a decelerator or an accelerator.

As described above, according to this embodiment, the strength of the tooth 104 of the first double helical gear 102 can be increased, and the lives of the first double helical gear 102 and the second double helical gear 103 can be approximated to each other. Therefore, the life as the resin double helical gear pair 101 can be lengthened.

In this embodiment, the aspect in which the peak 108 of the tooth 104 corresponds to the center in the tooth width direction Wc in the first double helical gear 102 has been exemplified. However, the embodiment is not limited thereto. When the peak 108 of the tooth 104 and the center in the tooth width direction Wc are misaligned with each other in the tooth width direction, the addendum modification coefficient is changed based on the peak 108 so that at least the addendum modification coefficient of the peak 108 becomes largest.

Change mode of the addendum modification coefficient of the tooth 104 of the first double helical gear 102 is not limited to the modes shown in FIGS. 2a to 2d. It is enough that at least the addendum modification coefficient of the peak 108 is larger than the addendum modification coefficient of the other sections, and the strength of the dedendum of the peak 108 can be increased effectively more than that of the other sections.

MODIFIED EXAMPLE

The present invention is not limited to the foregoing embodiment. The present invention can be also applied to a case that a first double helical gear and a second double helical gear composing a double helical gear pair have the same outer diameter dimension. For example, when the first double helical gear is on the drive side and the second double helical gear is on the driven side, experience shows that a large stress acts on the dedendum of the peak of the first double helical gear, and the first double helical gear on the drive side comes to the end of its life earlier than the second double helical gear on the driven side. Therefore, the resin double helical gear pair in such an aspect is formed as follows. The tooth of the first double helical gear is formed in the same shape as that of the tooth 104 of the first double helical gear 102 according to the foregoing embodiment (refer to FIGS. 2a to 2d), and the second double helical gear is formed in the same shape as that of the tooth 105 of the second double helical gear 103 according to the foregoing embodiment. In result, the double helical gear pair according to this modified example can provide effects similar to those of the resin double helical gear pair 101 in the foregoing embodiment.

A description will be hereinafter given in detail of a second embodiment of the present invention with reference to FIG. 4 to FIG. 8.

Figure 4:
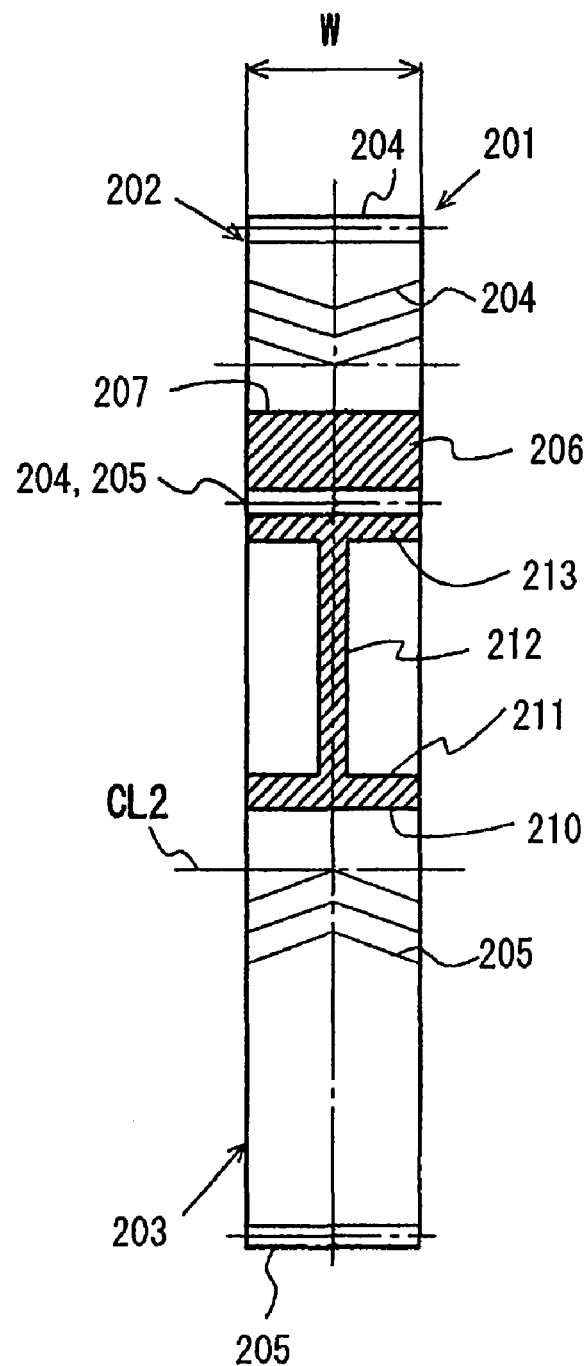
FIG. 4 is a view showing a resin double helical gear pair according to a second embodiment of the present invention.
Figure 5:
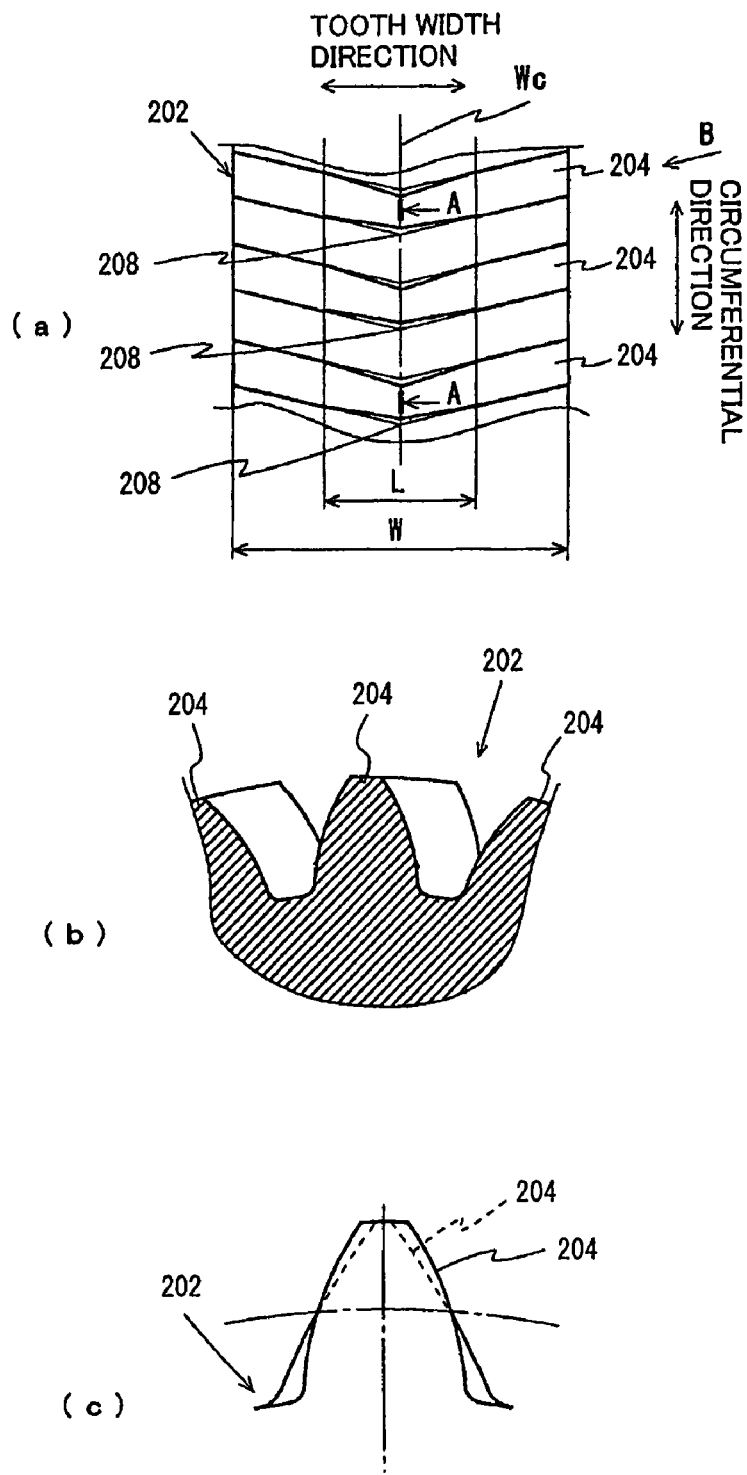
Figure 6:
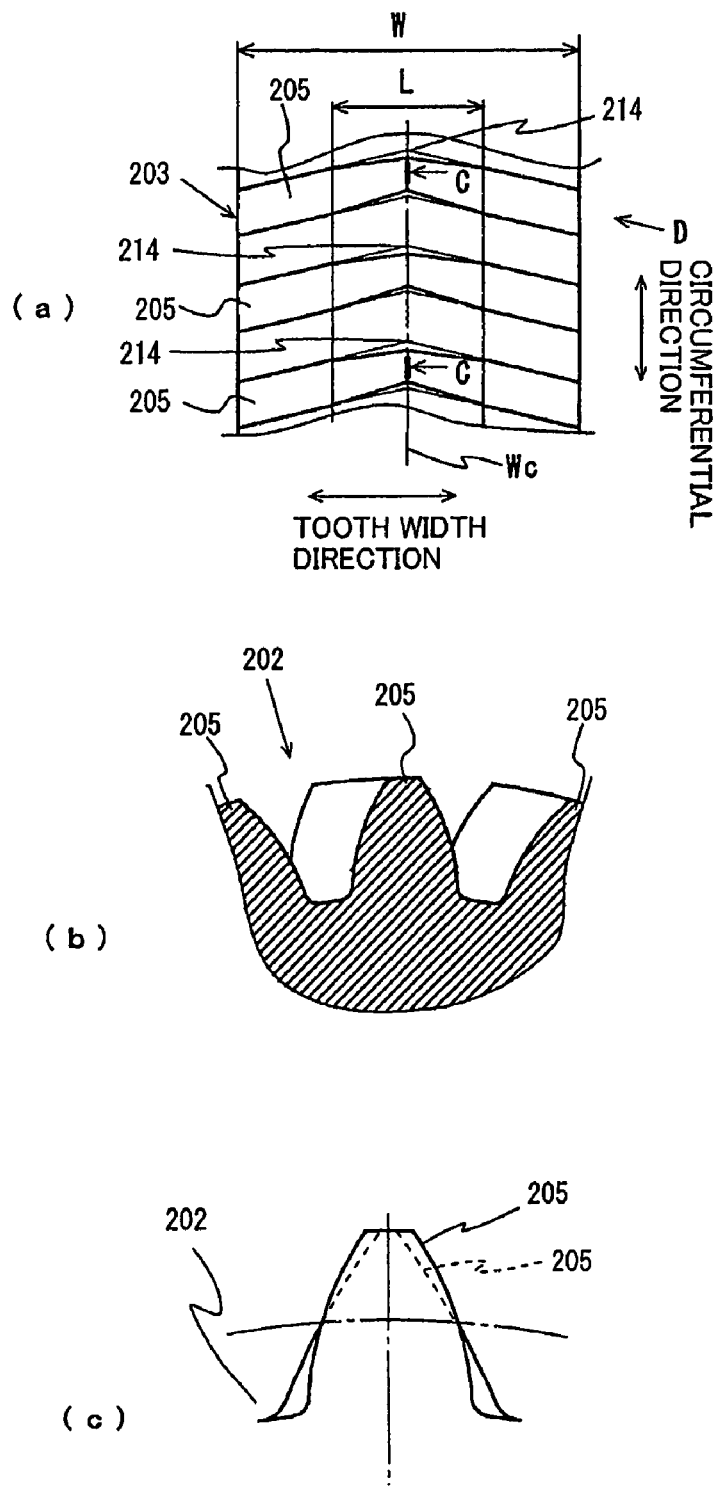

FIG. 4 shows a gearing resin double helical gear pair 201. Each resin double helical gear of the resin double helical gear pair 201 shown in FIG. 4 is injection-molded by using the same resin material (polyacetal (POM), polyamide, polycarbonate, ABS resin or the like). The resin double helical gear pair 201 is composed of a first double helical gear 202 with the smaller diameter and the smaller number of teeth (one resin double helical gear) and a second double helical gear 203 with the larger diameter and the larger number of teeth (the other resin double helical gear). A tooth 204 of the first double helical gear 202 and a tooth 205 of the second double helical gear 203 are chevron-shaped as if one helical gear is joined to the other helical gear with the tooth skew direction different from that of the one helical gear (in FIGS. 5a to 5c, the plain face thereof is approximately V-shaped). In the resin double helical gear pair 201, where the number of teeth of the first double helical gear 202 is Z1 and the number of teeth of the second double helical gear 203 is Z2, the deceleration ratio when power is transmitted from the first double helical gear 202 to the second double helical gear 203 is Z2/Z1, and the acceleration ratio is Z1/Z2.

In the first double helical gear 202 shown in FIG. 4, an axis hole 207 is formed in the central section of a web 206. A plurality of teeth 204 are formed on the outer circumferential side of the web 206. As shown in FIGS. 5a to 5c, the tooth 204 of the first double helical gear 202 is formed so that the pressure angle is gradually increased as the position is changed toward the center of the full tooth width Wc in vicinity L of the center of the full tooth width Wc (center in the tooth width direction) (for example, where the full tooth width is W, within the range of the larger dimension out of L=W/5 and 1 mm). Because of the following reason, the pressure angle of the vicinity L of the center in the tooth width direction of the tooth 204 (in a given range in the tooth width direction centering on the center in the tooth width direction) is gradually increased as the position is changed toward the center in the tooth width direction, and the tooth thickness on the dedendum side in the center in the tooth width direction of the tooth 204 is thickened. That is, attention is focused on the fact that in the case of a resin double helical gear with the skew angle of 15 degrees, the dedendum stress in the center in the tooth width direction of the tooth is larger by about 20% than the dedendum stress in the sections other than the center in the tooth width direction of the tooth. Thus, when the dedendum of the vicinity of the center in the tooth width direction is reinforced, the strength of the entire tooth can be effectively increased, while lowering of the gearing ratio should be inhibited as much as possible. Because of the following reason, the dimension of the vicinity L of the center in the tooth width direction is W/5 (L=W/5). That is, to decrease the dedendum stress of the center in the tooth width direction by about 20%, it is supposedly sufficient that the reinforcement target range is the range about W/5. Accordingly, it is determined that when the pressure angle is changed in the range of ⅕ of the full tooth width W, the gearing ratio is not largely changed. Because of the following reason, the vicinity L of the center in the tooth width direction in which the pressure angle is changed is the larger dimension out of L=W/5 and 1 mm. When W/5 is smaller than 1 mm, it becomes difficult to precisely form the tooth shape. That is, the vicinity L of the center in the tooth width direction is W/S in the case of W/5>1 mm, and 1 mm in the case of W/5<1 mm.

As shown in FIG. 5c, in the first double helical gear 202 formed as above, the tooth thickness dimension on the dedendum side becomes larger as the position is changed toward the center of the full tooth width Wc in the vicinity L of the center of the full tooth width Wc of the tooth 204. Thus, the strength of the dedendum of the vicinity of the peak 208 of the tooth 204 subject to stress concentration can be effectively increased.

Figure 7:
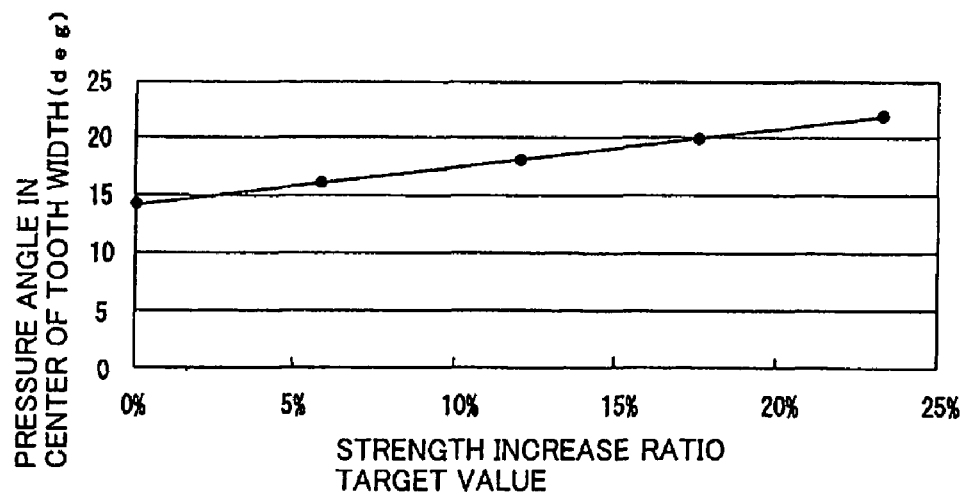
FIG. 7 is a diagram showing a relation between a pressure angle in the center in the tooth width direction and a strength increase ratio target value.

As shown in FIG. 7, where the pressure angle of the tooth 204 of the sections other than the vicinity of the center in the tooth width direction is 14.5 degrees, the strength of the tooth can be increased by 20% (the dedendum stress can be decreased by 20%) by setting the pressure angle in the center in the tooth width direction to 20.8 degrees. FIG. 7 shows that to increase the strength of the tooth 204 by 1%, the pressure angle should be increased by 1.04 degrees. That is, where the pressure angle is expressed as α and the strength increase ratio is expressed as β, straight line T1 shown in FIG. 7 represents relation of α=14.5 degrees+1.04β.

The first double helical gear 202 described above is used as, for example, a pinion gear fixed to the output shaft of the motor to work as part of a decelerator. Otherwise, the first double helical gear 202 described above is used as, for example, a gear on the driven side to work as part of an accelerator.

The second double helical gear 203 shown in FIG. 4 includes a boss section 211 formed with an axis 210 in the central section, a discoid web 212 extending from the section that is located on the outer circumferential side of the boss section 211 and in the central section in the width direction (central section in the direction along axis center CL2) toward outside in the diameter direction, and a cylindrical rim 213 formed on the outer circumference of the web 212. The plurality of teeth 205 gearing into the teeth 204 of the first double helical gear 202 are formed on the outer circumferential side of the rim 213.

As shown in FIGS. 6a to 6c, the tooth 205 of the second double helical gear 203 is formed in the shape similar to the shape of the tooth 204 of the first double helical gear 202 in the vicinity L of the center of the full tooth width Wc. That is, the tooth 205 of the second double helical gear 203 is formed so that the pressure angle change is the same as the pressure angle change of the tooth 204 of the first double helical gear 202 within the range in the tooth width direction same as that of the tooth 204 of the first double helical gear 202 (vicinity L of the center in the tooth width direction). Further, the tooth 205 of the second double helical gear 203 is formed so that the pressure angle in the place gearing into the tooth 204 of the first double helical gear 202 is the same as the pressure angle of the tooth 204 of the first double helical gear 202.

In the same manner as in the first double helical gear 202, in the second double helical gear 203 formed as above, the strength of the dedendum of the vicinity of the peak 214 of the tooth 205 subject to stress concentration can be effectively increased, and the dedendum stress in the center in the tooth width direction of the tooth 205 can be decreased.

The second double helical gear 203 in the foregoing shape is used twin to the first double helical gear 202, and works as part of a decelerator or an accelerator.

As described above, according to this embodiment, the strength of the tooth 204 of the first double helical gear 202 can be increased, the strength of the tooth 205 of the second double helical gear 203 can be increased, and the life of the double helical gear pair 201 can be lengthened.

MODIFIED EXAMPLE

Figure 8:
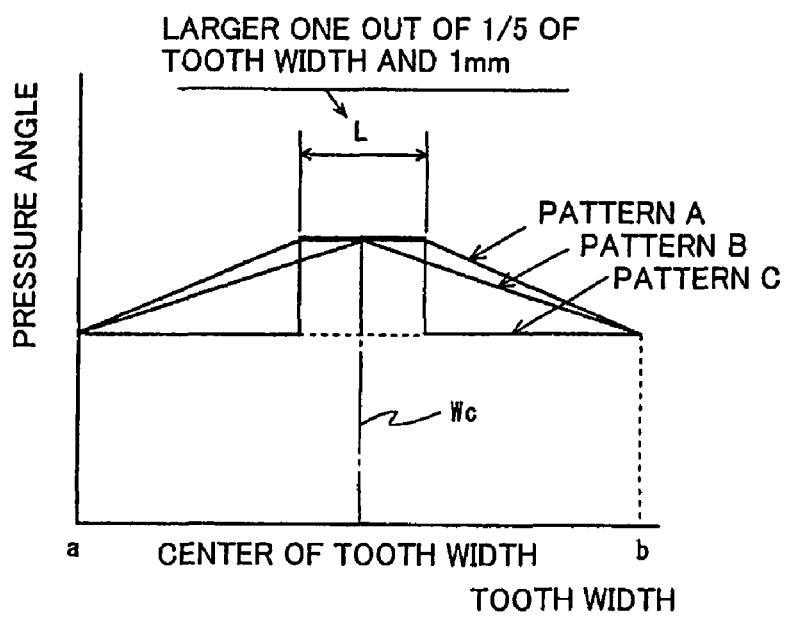
FIG. 8 is a diagram showing a modified example of the resin double helical gear pair according to the second embodiment of the present invention.

The present invention is not limited to the foregoing embodiment. As shown in FIG. 8, it is enough that the pressure angle of the vicinity L of the center in the tooth width direction of the teeth 204 and 205 is larger than the pressure angle of the other sections (sections other than the vicinity L of the center in the tooth width direction). As a manner of changing the pressure angle of the teeth 204 and 205, multiple variations may be conceived. For example, as pattern A of FIG. 8, it is possible that the pressure angle of the vicinity L of the center in the tooth width direction of the teeth 204 and 205 is constant, and the pressure angle of the sections other than the vicinity of the center in the tooth width direction of the teeth 204 and 205 is gradually decreased as the position is changed from the vicinity L of the center in the tooth width direction toward the end in the tooth width direction. Further, as pattern B of FIG. 8, the pressure angle may be gradually decreased as the position is changed from the center in the tooth width direction (Wc) of the teeth 204 and 205 toward the both end sides in the width direction. Further, as pattern C of FIG. 8, it is possible that the pressure angle of the sections other than the vicinity of the center in the tooth width direction of the teeth 204 and 205 is a constant reference pressure angle, only the pressure angle of the vicinity L of the center in the tooth width direction is larger than the reference pressure angle and constant. In FIG. 8, a and b may be one end in the tooth width direction of the teeth 204 and 205 and the other end in the tooth width direction thereof. Otherwise, a and b may be located in a given position between one end in the tooth width direction of the teeth 204, 205 and the vicinity L in the tooth width direction, and located in a given position between the other end in the tooth width direction of the teeth 204, 205 and the vicinity L in the tooth width direction.

A description will be hereinafter given in detail of a third embodiment of the present invention with reference to FIG. 9 to FIG. 11f.

Figure 9:
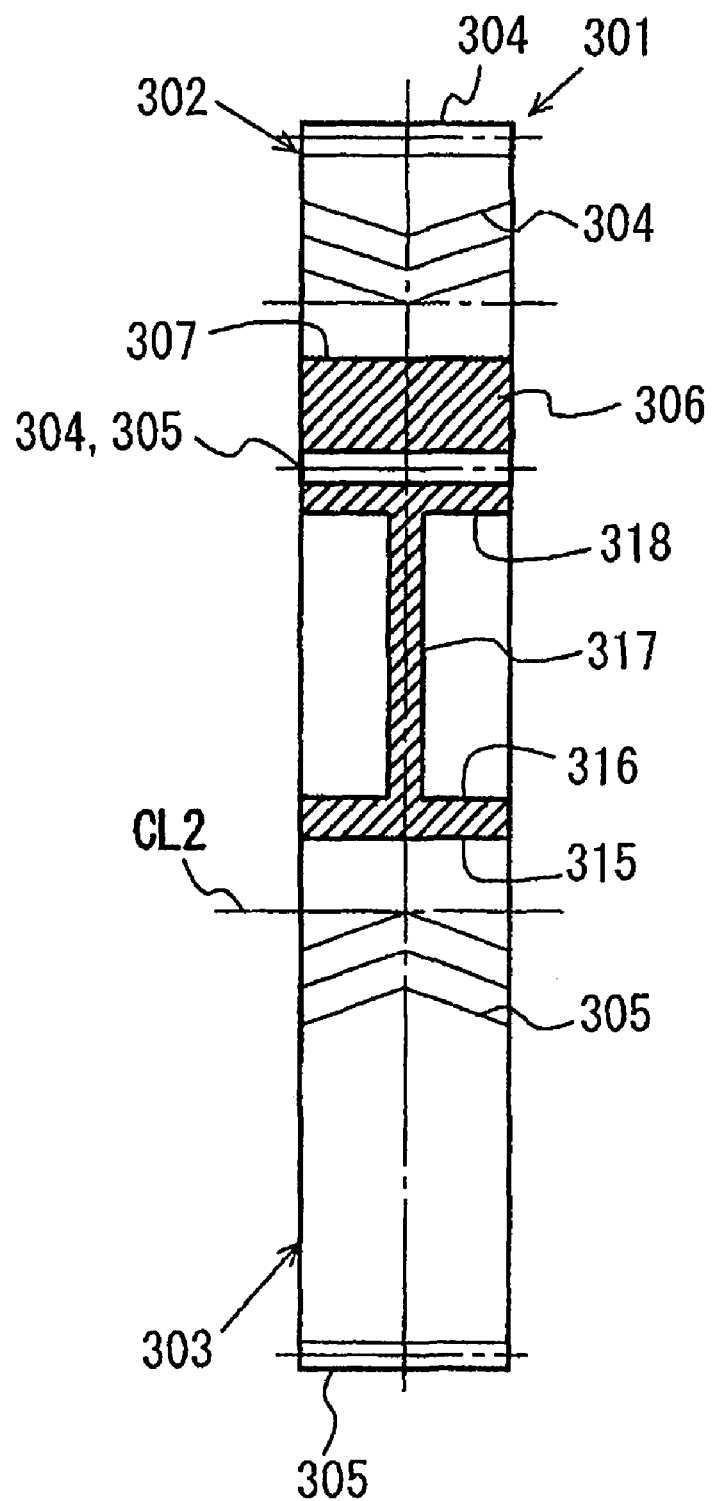
FIG. 9 is a view showing a resin double helical gear pair according to a third embodiment of the present invention.
Figure 10:
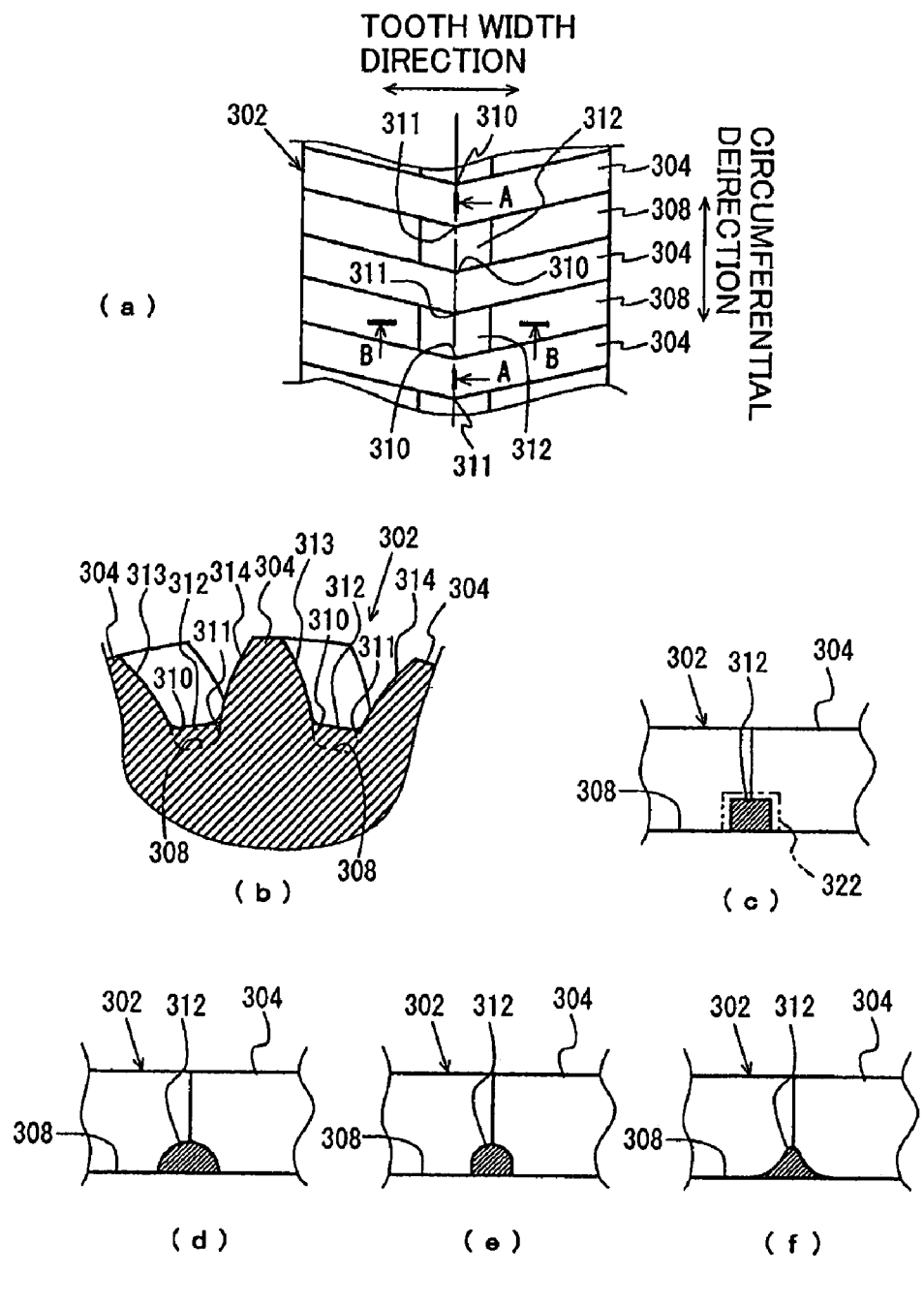
Figure 11:
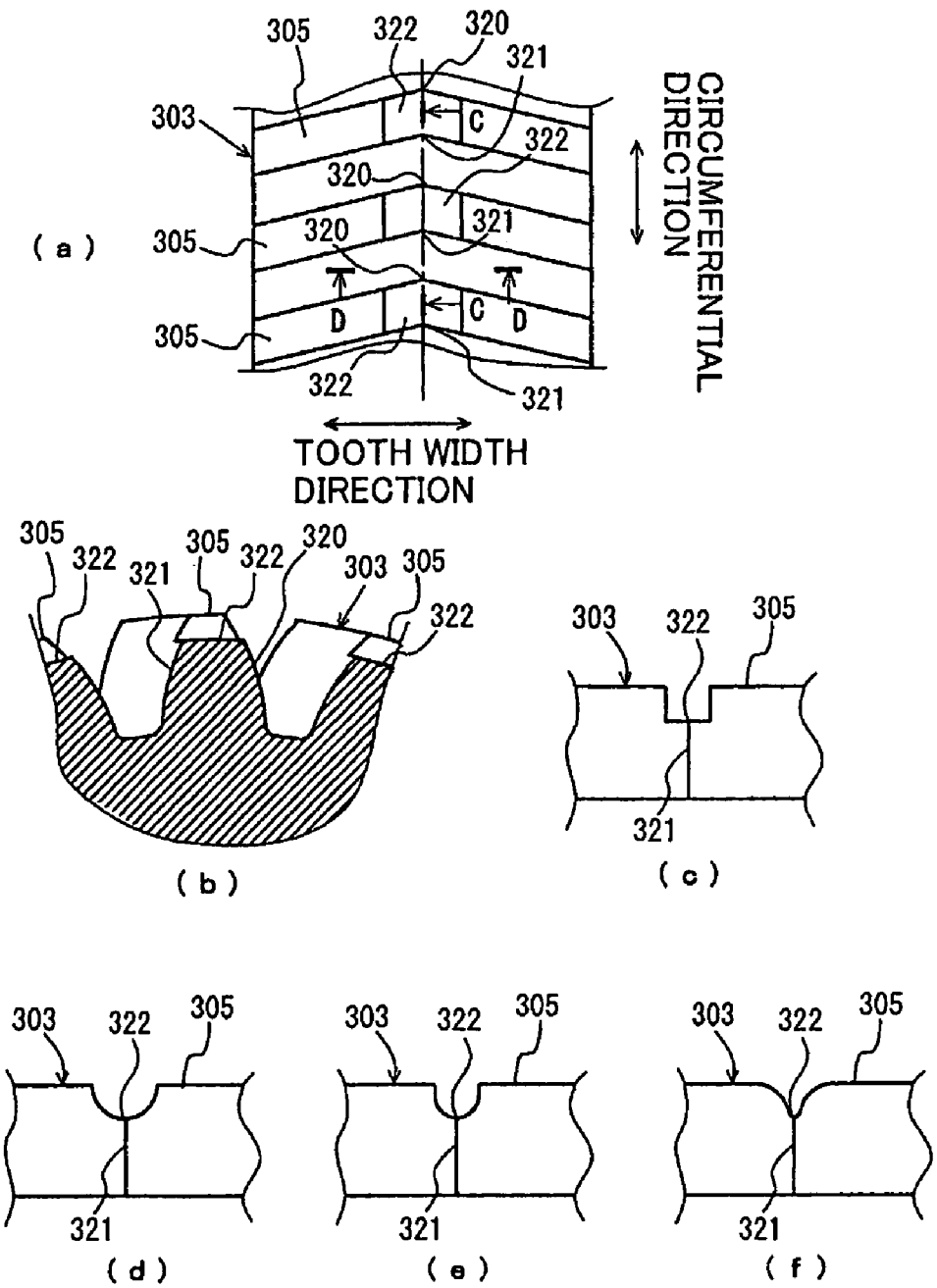

FIG. 9 shows a gearing resin double helical gear pair 301. Each resin double helical gear of the resin double helical gear pair 301 shown in FIG. 9 is injection-molded by using the same resin material (polyacetal, polyamide, polycarbonate, ABS resin or the like). The resin double helical gear pair 301 is composed of a first double helical gear 302 with the smaller diameter and the smaller number of teeth (one resin double helical gear) and a second double helical gear 303 with the larger diameter and the larger number of teeth (the other resin double helical gear). A tooth 304 of the first double helical gear 302 and a tooth 305 of the second double helical gear 303 are chevron-shaped as if one helical gear is joined to the other helical gear with the skew direction different from that of the one helical gear (in FIGS. 10a to 10f, the plain face thereof is approximately V-shaped). In the resin double helical gear pair 301, where the number of teeth of the first double helical gear 302 is Z1 and the number of teeth of the second double helical gear 303 is Z2, the deceleration ratio when power is transmitted from the first double helical gear 302 to the second double helical gear 303 is Z2/Z1, and the acceleration ratio is Z1/Z2.

In the first double helical gear 302 shown in FIG. 9, an axis hole 307 is formed in the central section of a web 306. A plurality of teeth 304 are formed on the outer circumferential side of the web 306. As shown in FIGS. 10a to 10f, the first double helical gear 302 is formed so that a stiffening rib 312 protrudes toward outside in the diameter direction. The stiffening rib 312 connects a valley section on the dedendum side (rear face section on the dedendum side) 310 of one tooth 304 to a peak on the dedendum side (front face section on the dedendum side) 311 of the other tooth 304 along the circumferential direction (rotational direction or inverse direction thereof) in the central section of the full tooth width (central section in the tooth width direction) and in a bottom 308 between the adjacent teeth 304 (one tooth 304 and the other tooth 304).

The stiffening rib 312 is not limited to the cross sectional shape shown in FIG. 10c. The stiffening rib 312 may be formed as the cross sectional shape shown in FIG. 10d (cross sectional shape in the shape of a semicircle), the cross sectional shape shown in FIG. 10e (cross sectional shape in the shape of a rectangle with the top corners rounded off), or the cross sectional shape shown in FIG. 10f (chevron cross sectional shape with the bottom moderately widened). To prevent stress concentration, the stiffening rib 312 is connected to tooth flanks 313 and 314 and the bottom 308 with a smooth curved surface (refer to FIG. 10b). Further, in the stiffening rib 312 shown in FIG. 10c, each corner is preferably R-chamfered.

The first double helical gear 302 described above is used as, for example, a pinion gear fixed to the output shaft of the motor to work as part of a decelerator. Otherwise, the first double helical gear 302 described above is used as, for example, a gear on the driven side to work as part of an accelerator.

The second double helical gear 303 shown in FIG. 9 includes a boss section 316 formed with an axis hole 315 in the central section, a discoid web 317 extending from the section that is located on the outer circumferential side of the boss section 316 and in the central section in the width direction (central section in the direction along axis center CL2) toward outside in the diameter direction, and a cylindrical rim 318 formed on the outer circumference of the web 317. The plurality of teeth 305 gearing into the teeth 304 of the first double helical gear 302 are formed on the outer circumferential side of the rim 318. As shown in FIGS. 11a to 11f, in the second double helical gear 303, a stiffing rib recess groove 322 is formed along the circumferential direction (rotational direction). The stiffing rib recess groove 322 extends from a peak 320 side to a valley section 321 side of the tooth 305 in the central section of the full tooth width and on the tooth tip side of the tooth 305. Thus, when the second double helical gear 303 gears into the first double helical gear 302 to rotate itself (in power transmission), each tooth 305 does not interfere with the stiffing rib 312 of the first double helical gear 302 (refer to FIG. 10c). The stiffing rib recess groove 322 of FIGS. 11c to 11f are formed in the cross sectional shape corresponding to the stiffing rib 312 of FIGS. 10c to 10f respectively. In the respective stiffing rib recess grooves 322 of FIGS. 11c to 11f, each corner of the groove bottom or each groove end are chamfered (R-chamfered and C-chamfered) to prevent stress concentration.

The second double helical gear 303 in the foregoing shape is used twin to the first double helical gear 302, and works as part of a decelerator or an accelerator.

As described above, according to this embodiment, the strength of the first double helical gear 302 with the rotational speed higher than that of the second double helical gear 303 can be increased by the stiffing rib 312. Therefore, the life of the first double helical gear 302 can be approximated to the life of the second double helical gear 303.

As a method to increase the strength of the tooth 304 of the first double helical gear 302, it is conceivable to increase the tooth thickness on the dedendum side of the tooth 304 over the entire section in the full tooth width direction. However, in such a method, the gearing ratio of the resin double helical gear pair is lowered. Thus, the inherent function of the resin double helical gear pair to quiet down the operating sound and deaden the vibrations is lost.

Meanwhile, according to the resin double helical gear pair 301 of this embodiment, the peak on the dedendum side 311 of the tooth 304 subject to stress concentration and the valley section on the dedendum side 310 of the adjacent tooth 304 are connected by the stiffening rib 312 in the central section of the full tooth width (central section as part of the full tooth width). Therefore, lowering of the gearing ratio can be inhibited, the strength of the tooth 304 can be effectively increased.

MODIFIED EXAMPLE

The present invention is not limited to the resin double helical gear pair 301 according to the foregoing embodiment. The following method may be employed. That is, the dedendum side in the central section in the tooth width direction of the teeth 304 and 305 of the first and the second double helical gears 302 and 303 is respectively reinforced by the stiffing rib 312. In addition, on the tooth tip side in the central section in the tooth width direction of the teeth 304 and 305 of the first and the second double helical gears 302 and 303, the stiffing rib recess groove 322 is formed to prevent interference with the stiffing rib 312 on a gearing counterpart.

According to this modified example, the dedendum side in the central section in the tooth width direction on which the largest stress acts out of the teeth 304 and 305 of the gearing resin double helical gear pair 301 is effectively reinforced by the stiffing rib 312. Thereby, the strength of the teeth 304 and 305 of the gearing resin double helical gear pair 301 can be effectively increased, and the life of the resin double helical gear pair 301 can be lengthened. In this modified example, when the number of teeth of the first and the second double helical gears 302 and 303 is identical, the strength of the teeth 304 and 305 of the first and the second double helical gears 302 and 303 can be uniformly increased.

What is claimed is:

1. A resin double helical gear pair comprising:
a first resin double helical gear; and
a second resin double helical gear gearing into the first double helical gear, wherein the first double helical gear has a diameter smaller than a diameter of the second double helical gear,
the first double helical gear is formed so that at least an addendum modification coefficient of a peak of a chevron tooth is larger than addendum modification coefficients of other sections of said chevron tooth, and
the second double helical gear is formed so that a sum of the addendum modification coefficient of the first double helical gear and an addendum modification coefficient of the second double helical gear in a gearing position of the first double helical gear and the second double helical gear is a constant value along a tooth width direction;
whereby the strength and life of the first and second resin double helical gears are increased.

2. A resin double helical gear pair comprising:
a first resin double helical gear on a drive side; and
a second resin double helical gear gearing into the first double helical gear on a driven side, wherein
the first double helical gear and the second double helical gear have the same diameter,
the first double helical gear is formed so that at least an addendum modification coefficient of a peak of a chevron tooth is larger than addendum modification coefficients of other sections of said chevron tooth, and
the second double helical gear is formed so that a sum of the addendum modification coefficient of the first double helical gear and an addendum modification coefficient of the second double helical gear in a gearing position of the first double helical gear and the second double helical gear is a constant value along a tooth width direction.

3. A resin double helical gear pair comprising:
a first resin double helical gear; and
a second resin double helical gear gearing into the first double helical gear, wherein
the first double helical gear has a diameter smaller than a diameter of the second double helical gear,
the first double helical gear is formed so that an addendum modification coefficient of a vicinity of a peak of a chevron tooth is larger than addendum modification coefficients of other sections of said chevron tooth, and
the second double helical gear is formed so that a sum of the addendum modification coefficient of the first double helical gear and an addendum modification coefficient of the second double helical gear in a gearing position of the first double helical gear and the second double helical gear is a constant value along a tooth width direction.

4. A resin double helical gear pair comprising:
a first resin double helical gear on a drive side; and
a second resin double helical gear gearing into the first double helical gear on a driven side, wherein
the first double helical gear and the second double helical gear have the same diameter,
the first double helical gear is formed so that at least an addendum modification coefficient of a vicinity of a peak of a chevron tooth is larger than addendum modification coefficients of other sections of said chevron tooth, and
the second double helical gear is formed so that a sum of the addendum modification coefficient of the first double helical gear and an addendum modification coefficient of the second double helical gear in a gearing position of the first double helical gear and the second double helical gear is a constant value along a tooth width direction.

5. A resin double helical gear pair comprising:
a first resin double helical gear; and
a second resin double helical gear gearing into the first double helical gear, wherein
the first double helical gear has a diameter smaller than a diameter of the second double helical gear,
the first double helical gear is formed so that an addendum modification coefficient is gradually decreased as a position is changed from a peak of a chevron tooth toward both ends in a tooth width direction of said chevron tooth, and the second double helical gear is formed so that a sum of the addendum modification coefficient of the first double helical gear and an addendum modification coefficient of the second double helical gear in a gearing position of the first double helical gear and the second double helical gear is a constant value along the tooth width direction.

6. A resin double helical gear pair comprising:
a first resin double helical gear on a drive side; and
a second resin double helical gear gearing into the first double helical gear on a driven side, wherein
the first double helical gear and the second double helical gear have the same diameter,
the first double helical gear is formed so that an addendum modification coefficient is gradually decreased as a position is changed from a peak of a chevron tooth toward both ends in a tooth width direction of said chevron tooth, and
the second double helical gear is formed so that a sum of the addendum modification coefficient of the first double helical gear and an addendum modification coefficient of the second double helical gear in a gearing position of the first double helical gear and the second double helical gear is a constant value along the tooth width direction.

7. A resin double helical gear pair comprising:
one resin double helical gear having multiple chevron teeth in the shape as if one helical gear is joined to the other helical gear with the skew direction different from that of the one helical gear in a center in a width direction; and
the other resin double helical gear having multiple teeth gearing into the teeth of the one resin double helical gear, wherein
the teeth of the one resin double helical gear are formed so that at least a pressure angle of the vicinity of the center in the tooth width direction is larger than a pressure angle of sections other than the vicinity of the center in the tooth width direction, and
the teeth of the other resin double helical gear are formed so that a pressure angle is changed in the same manner as the teeth of the one resin double helical gear.

8. The resin double helical gear pair according to claim 7, wherein the pressure angle of the vicinity of the center in the width direction of the teeth of the one resin double helical gear is gradually decreased as the position is changed from the center in the tooth width direction toward an end side in the tooth width direction, and the pressure angle of the sections other than the vicinity of the center in the tooth width direction of the teeth of the one resin double helical gear is changed continuously from change of the pressure angle of the vicinity of the center in the tooth width direction.

9. The resin double helical gear pair according to claim 7, wherein in the teeth of the one resin double helical gear, the pressure angle of the vicinity of the center in the tooth width direction is constant, and the pressure angle of the sections other than the vicinity of the center in the tooth width direction is gradually decreased as the position departs from the vicinity of the center in the tooth width direction.

10. The resin double helical gear pair according to claim 7, wherein in the teeth of the one resin double helical gear, the pressure angle of the vicinity of the center in the tooth width direction is constant, and the pressure angle of the sections other than the vicinity of the center in the tooth width direction is smaller than the pressure angle of the vicinity of the center in the tooth width direction and is constant.

11. A resin double helical gear pair having multiple chevron teeth in the shape as if one helical gear is joined to the other helical gear with the skew direction different from that of the one helical gear in a center in a width direction, wherein
the number of teeth of one gearing resin double helical gear is smaller than the number of teeth of the other gearing resin double helical gear,
in the one resin double helical gear, a peak on a dedendum side of a chevron tooth and a valley section on a dedendum side of an adjacent tooth are connected by a stiffing stiffening rib protruding from a bottom in the central section in a tooth width direction, and
in the other resin double helical gear, a stiffening rib recess groove along a rotational direction is formed in the central section in the tooth width direction of the tooth and on a tooth tip side of the tooth, so that the stiffening rib of the one resin double helical gear does not interfere with the tooth in power transmission.

12. A resin double helical gear pair comprising:
one resin double helical gear having multiple chevron teeth in the shape as if one helical gear is joined to the other helical gear with the skew direction different from that of the one helical gear in a center in a width direction; and
the other resin double helical gear having multiple chevron teeth gearing into the teeth of the one resin double helical gear, wherein
in the one resin double helical gear and the other resin double helical gear, a peak on a dedendum side of a chevron tooth and a valley section on a dedendum side of an adjacent tooth are connected by a stiffening rib protruding from a bottom in the central section in a tooth width direction, and
in the one resin double helical gear and the other resin double helical gear, a stiffening rib recess groove along a rotational direction is formed in the central section in the tooth width direction of the tooth and on a tooth tip side of the tooth, so that the stiffening rib of a gearing counterpart does not interfere with the tooth in power transmission.

* * * * *